O. A. EYERMAN & M. W. HIMMLER.
CAR WHEEL AND AXLE.
APPLICATION FILED NOV. 11, 1914.
1,155,557.
Patented Oct. 5, 1915.
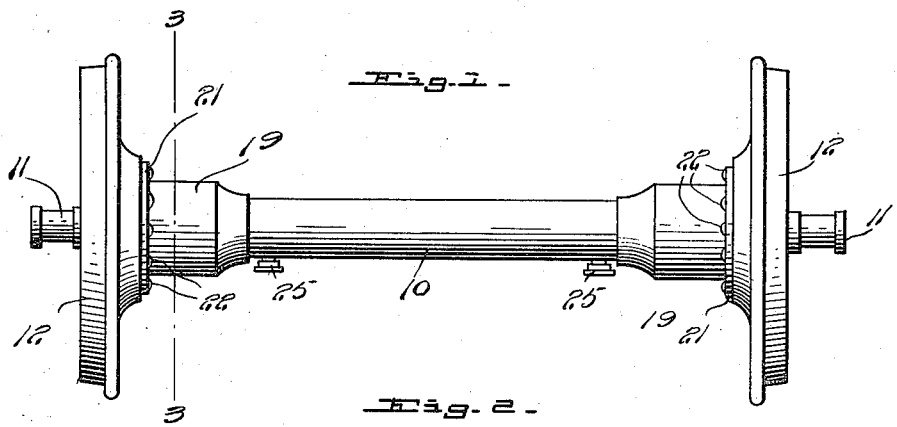
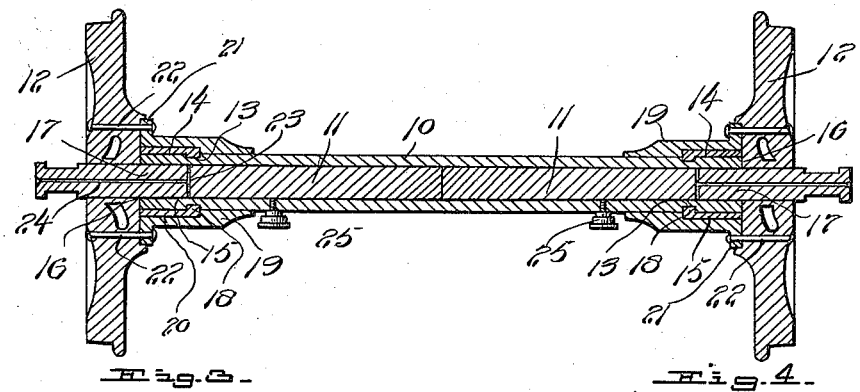
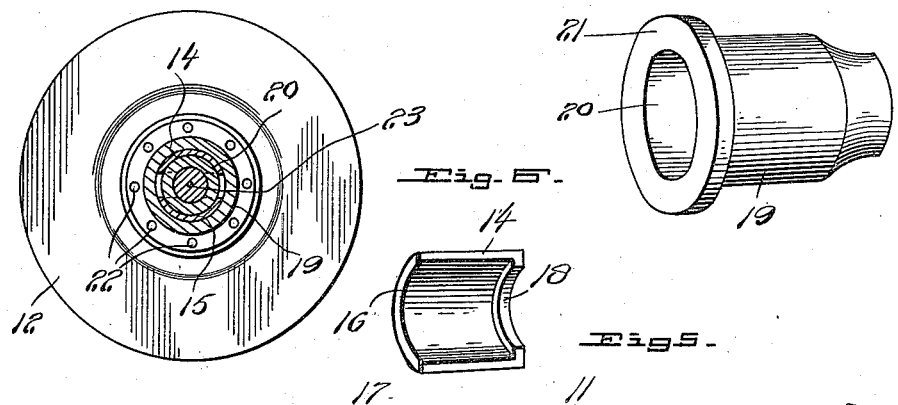
Witnesses
Inventors
M. W. Himmler
O. A. Eyerman
By
Attorneys
COLUMBIA PLANOGRAPH CO., WASHINGTON, D. C.

UNITED STATES PATENT OFFICE.

OSCAR A. EYERMAN AND MARTIN W. HIMMLER, OF CUMBERLAND, MARYLAND.

CAR WHEEL AND AXLE.

1,155,557.  Specification of Letters Patent.  Patented Oct. 5, 1915.

Application filed November 11, 1914. Serial No. 871,557.

*To all whom it may concern:*

Be it known that we, OSCAR A. EYERMAN and MARTIN W. HIMMLER, citizens of the United States, residing at Cumberland, in the county of Allegany, State of Maryland, have invented certain new and useful Improvements in Car Wheels and Axles; and we do hereby declare the following to be a full, clear, and exact description of the invention, such as will enable others skilled in the art to which it appertains to make and use the same.

This invention relates to car wheels and axles.

The object of the invention is to produce combined car wheels and axles which shall be simple, durable, and inexpensive in construction; and which shall furthermore permit of independent rotation of the two wheels of each axle when the car is rounding curves, thus preventing the slip and drag and tendencies toward rail spreading and climbing, as well as derailment, which are liable to occur with wheels and axles which are compelled to always rotate in unison.

A further object of the invention is to produce a combined axle and wheels which, in addition to the advantages above set forth, shall be capable of perfect and economical lubrication, and which shall be entirely dust and dirt proof.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a view in elevation of a car axle and wheels constructed in accordance with the invention; Fig. 2, a vertical longitudinal section of same; Fig. 3, a section on the line 3—3 of Fig. 1; Fig. 4, a perspective view of the retaining collar; Fig. 5, a perspective view of one of the solid axle sections, and Fig. 6, a perspective view of one of the gibs employed to lock the wheel and solid axle section to the tubular axle section.

Referring to the drawings the invention is shown as comprising a tubular axle section 10 in each end of which is rotatably mounted a solid axle section 11 and upon the outer end of each solid axle section 11 is shrunk or otherwise suitably secured a wheel 12. As each solid axle section 11 is secured against disengagement from the tubular section 10 by similar structures only one of such structures will be described in detail.

Formed on the outer side of the tubular axle section 10 adjacent one end of said section is a circumscribing groove 13. The invention further embodies semicylindrical gibs 14 and 15 each of which embodies a major end 16 bearing against the inner side of the wheel 12. Each gib also includes minor end 18 engaged in the groove 13 and bearing against the bottom of said groove. The thickness of the gibs 14 and 15 is such that the outer cylindrical faces thereof are disposed beyond the outer face of the tubular shaft section 10. Surrounding the end of the tubular shaft section 10 is a collar 19 having an enlarged bore portion 20 which receives the gibs 14 and 15. The outer end of the collar 19 bears against the inner side of the wheel 12 and is provided with a circumscribing flange 21 through which is engaged fastening devices 22 which also pass through the wheel 12 and rigidly secure said collar and wheel together for rotation in unison. Extending transversely through the solid axle section 11 is a passage 23 which communicates with a passage 24 extending longitudinally through the axle section 11 and opening through the outer end of said axle section. The passages 24 and 23 serve as a means for supplying oil between the contacting faces of the axle sections 10 and 11, which oil will also work between the engaging faces of other adjacent relatively movable parts. Mounted in the axle section 10 is a grease cup 25 for the purpose of supplying grease between the engaging faces of the axle sections 10 and 11.

What is claimed is:—

A combined car axle and wheel comprising a tubular axle section, a solid axle section rotatable in the tubular axle section, a wheel fixed on the solid axle section, a collar rotatable on and surrounding the tubular axle section, connections between the collar and the wheel, and a gib interposed between the collar and tubular axle section and having interlocking engagement with the collar and tubular axle section whereby said collar and tubular axle section are secured against relative longitudinal movement.

In testimony whereof we affix our signatures in the presence of two witnesses.

OSCAR A. EYERMAN.
MARTIN W. HIMMLER.

Witnesses:
JOHN N. OLIVER,
JOHN W. HECK.

Copies of this patent may be obtained for five cents each, by addressing the "Commissioner of Patents, Washington, D. C."